(12) United States Patent
Sun et al.

(10) Patent No.: US 8,094,823 B1
(45) Date of Patent: Jan. 10, 2012

(54) EXTENDED DIFFIE-HELLMAN GROUP KEY GENERATION

(75) Inventors: Sheng Sun, Kanata (CA); Guo Qiang Wang, Kanata (CA)

(73) Assignee: Rockstar BIDCO, LP, New York, NY (US)

( * ) Notice: Subject to any disclaimer, the term of this patent is extended or adjusted under 35 U.S.C. 154(b) by 577 days.

(21) Appl. No.: 12/343,589

(22) Filed: Dec. 24, 2008

(51) Int. Cl.
*H04L 9/08* (2006.01)

(52) U.S. Cl. ........................................... 380/282

(58) Field of Classification Search .......... 380/46, 380/171, 282
See application file for complete search history.

(56) References Cited

U.S. PATENT DOCUMENTS

| | | | |
|---|---|---|---|
| 6,684,331 B1 * | 1/2004 | Srivastava | 713/163 |
| 6,941,457 B1 * | 9/2005 | Gundavelli et al. | 713/163 |
| 6,987,855 B1 * | 1/2006 | Srivastava | 380/278 |
| 7,096,356 B1 * | 8/2006 | Chen et al. | 713/163 |
| 2002/0136407 A1 | 9/2002 | Denning et al. | |
| 2002/0199102 A1 | 12/2002 | Carman et al. | |
| 2005/0044356 A1 | 2/2005 | Srivastava et al. | |
| 2005/0141706 A1 | 6/2005 | Regli et al. | |

OTHER PUBLICATIONS

International Search Report and Written Opinion for International Application No. PCT/US09/68493 dated Jan. 28, 2010; 7 pages.

* cited by examiner

*Primary Examiner* — Carl Colin
*Assistant Examiner* — Dao Ho
(74) *Attorney, Agent, or Firm* — Guerin & Rodriguez, LLP

(57) ABSTRACT

Described are group key generation and distribution mechanisms that offer efficient protection for multi-party communication applications. A network includes a key distribution center (KDC) and m relay stations (RS). The KDC and each RS choose their own secret number. Each RS encodes its secret number and sends it to the KDC. The KDC uses the secret numbers from all the RS's, as well as its own secret number, to generate a random group key RGK. Then, to each RS, the KDC sends a partial key, which is a mathematical combination of the RGK with that RS's secret number. Each RS can then combine its secret number with the received partial key to deduce the RGK. Once all RS have deduced the RGK, the RGK can be used for further key exchange and encryption procedures and encrypted data transfer.

5 Claims, 4 Drawing Sheets

US 8,094,823 B1

EXTENDED DIFFIE-HELLMAN GROUP KEY GENERATION

FIELD OF THE INVENTION

The invention relates generally to telecommunications systems. More particularly, the invention relates to a system and method for relaying secure transmissions over a wireless telecommunications network. The invention further relates to other communication systems that involve multi-parties with stringent security requirements.

BACKGROUND

More and more sophisticated communication applications are becoming multi-party oriented. Multicast teleconferencing and multicast Ethernet video conferencing, and applications run over 802.16J wireless networks are examples of such multi-party communication applications. It's necessary to design secure protocols to protect the communication among the multiple participants in such applications.

Communications between participants can be securely protected by encrypting the communications in known ways. According to some protocols, parties to communications share a group key that is used to secure communications between the parties. Some method must be developed for the generation and distribution of this group key amongst the participants. There are a variety of practical requirements to satisfy a particular application, for example: the size of the multi-party communication; the size of the group key; the communication overhead involved with the distribution of the key; the computational overhead involved with the generation of the key; and the trust mode established through authentication.

In accordance with one known solution, each party in the group establishes pair-wise keys with every other peer in the group ("peer-to-peer keys"). This solution is not very practical or scalable in a sizable group as the number of participants increase, as the communication and computation overhead will exponentially increase. In accordance with another known solution, the production of the group encryption key is totally centralized and is independent of the membership of the group. A central key generator generates a key and refreshes it at fixed intervals, and distributes it to all the other participants. In this case, the distribution channel must be secured through encryption. And, the solution can't prevent the passive and active attack. Furthermore, the group key in this case cannot reflect the dynamic composition of the group at any moment and thus is prone to forward and backward security breaches.

What is needed is a group key generation and distribution algorithm that can provide efficient protection for the multi-party communication applications, while avoiding the shortcomings of the prior art solutions.

SUMMARY

The invention, in its various aspects, provides group key generation and distribution mechanisms that offer efficient protection for multi-party communication applications. In its most basic form, a network includes a key distribution center (KDC) and m relay stations (RS). The KDC and each RS choose their own secret number. Each RS encodes its secret number and sends it to the KDC. The KDC uses the secret numbers from all the RS's, as well as its own secret number, to generate a random group key RGK. Then, to each RS, the KDC sends a partial key, which is a mathematical combination of the RGK with that RS's secret number. Each RS can then combine its secret number with the received partial key to deduce the RGK. Once all RS have deduced the RGK, the RGK can be used for further key exchange protection or encryption procedures and encrypted data transfer.

In further accordance with the invention, there is a featured method for use in a network. The method includes the steps of arranging the network such that one member is a key distribution center (KDC) and the other m members are relay stations (RS), wherein RS(i) denotes the ith RS; sending by each RS(i) a random number K(i) based on $g\hat{\ }(i)$ to the KDC, wherein g is a generator and r(i) is a random integer picked by the RS(i); generating by the KDC a random group key RGK based on $g\hat{\ }(r(1)r(2) \ldots r(m))R$, wherein g is the generator, and R is a random number generated by the KDC; sending by the KDC back to each RS(i) a partial key $g\hat{\ }((r(1)r(2) \ldots r(m))Rr(i)^{-1})$; generating by each RS(i) from the received partial key the RGK based on $g\hat{\ }(r(1)r(2) \ldots r(m)R)r(i)$; and using the RGK by all m members of the group to secure communications between the members of the group.

Also in accordance with the invention, once and RGK is established, a new relay station can join the network. Such method includes the steps of adding a new relay station RS(o) to the network; sending by RS(o) a random number K(o) based on $g\hat{\ }(o)$ to the KDC, wherein g is a generator and r(o) is a random integer picked by the RS(o); generating by the KDC a random group key RDK' based on $g\hat{\ }(r(1)r(2) \ldots r(m)r(o))R$, sending by the KDC back to RS(o) a partial key $g\hat{\ }((r(1)r(2) \ldots r(m)r(o)R)r(o)^{-1})$; sending by the KDC back to each RS(i) a partial key $g\hat{\ }((r(1)r(2) \ldots r(m)r(o))Rr(i)^{-1})$; and using the RDK' by all m members of the group and RS(o) to secure communications between the members of the group including RS(o).

Further in accordance with the invention, a network includes a group including m relay stations RS, wherein RS(i) denotes the ith RS, and a key distribution center KDC, wherein each RS(i) sends a random number K(i) based on $g\hat{\ }r(i)$ to the KDC. The KDC generates a random group key RDK based on $g\hat{\ }(r(1)r(2) \ldots r(m))R$, wherein g is a generator, R is a random number generated by the KDC, and r(1), r(2) . . . r(m) are random numbers generated by each RS(i) RS(1), RS(2) . . . RS(m) respectively. The KDC sends back to each RS(i) a partial key based on $g\hat{\ }((r(1)r(2) \ldots r(m))Rr(i)^{-1})$. Each RS(i) uses the received partial key to generate the RDK based on $g\hat{\ }(r(1)r(2) \ldots r(m)R)r(i)$; The RDK is used by all m members of the group to secure communications between the members of the group. In its most basic form, a network includes a key distribution center (KDC) and m relay stations (RS). The KDC and each RS choose their own secret number. Each RS encodes its secret number and sends it to the KDC. The KDC uses the secret numbers from all the RS's, as well as its own secret number, to generate a random group key RGK. Then, to each RS, the KDC sends a partial key, which is a mathematical combination of the RGK with that RS's secret number. Each RS can then combine its secret number with the received partial key to deduce the RGK. Once all RS have deduced the RGK, the RGK can be used for further key exchange and encryption procedures and encrypted data transfer.

Also in accordance with the invention, there is provided a program product comprising a computer readable medium having embodied therein a computer program for storing data, the computer program for operation in a node in a relay network. The computer program includes logic for sending by a relay station RS(1) a random number K(1) based on $g\hat{\ }(1)$ to a key distribution center (KDC), wherein g is a generator and r1 is a random integer picked by RS1, RS1 being one of group of m relay stations wherein RS(i) notes the ith RS and each RS(i) sends a K(i) based on $g^{(i)}$ to the KDC; logic for receiving by RS(1) partial key $g^{((r(1)r(2) \ldots r(m))Rr(i)^{-1})}$, the partial key generated and sent by the KDC, the KDC first generating a random group key RDK based on $g^{(r(1)} r(2) \ldots r(m))R$, wherein g is the generator, and R is a random number generated by the KDC, the KDC then generating the partial key; logic for generating by RS(1) from the received partial key the RDK based on $g^{(r(2)} \ldots r(m)R)$; and logic for using by RS(1) the RDK for secure communications between RS1 and the other relay stations of the group.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION OF EXEMPLARY EMBODIMENTS

In brief overview, a novel extension of the Diffie-Hellman key agreement algorithm is used to establish the shared secret among the members of a group. The invention is particularly applicable in relay network environments. In its most basic form, a network includes a key distribution center (KDC) and m relay stations (RS). The KDC and each RS choose their own secret number. Each RS encodes its secret number and sends it to the KDC. The KDC uses the secret numbers from all the RS's, as well as its own secret number, to generate a random group key RGK. Then, to each RS, the KDC sends a partial key, which is a mathematical combination of the RGK with that RS's secret number. Each RS can then combine its secret number with the received partial key to deduce the RGK. Once all RS have deduced the RGK, the RGK can be used for further key exchange and encryption procedures and encrypted data transfer.

Figure 1:
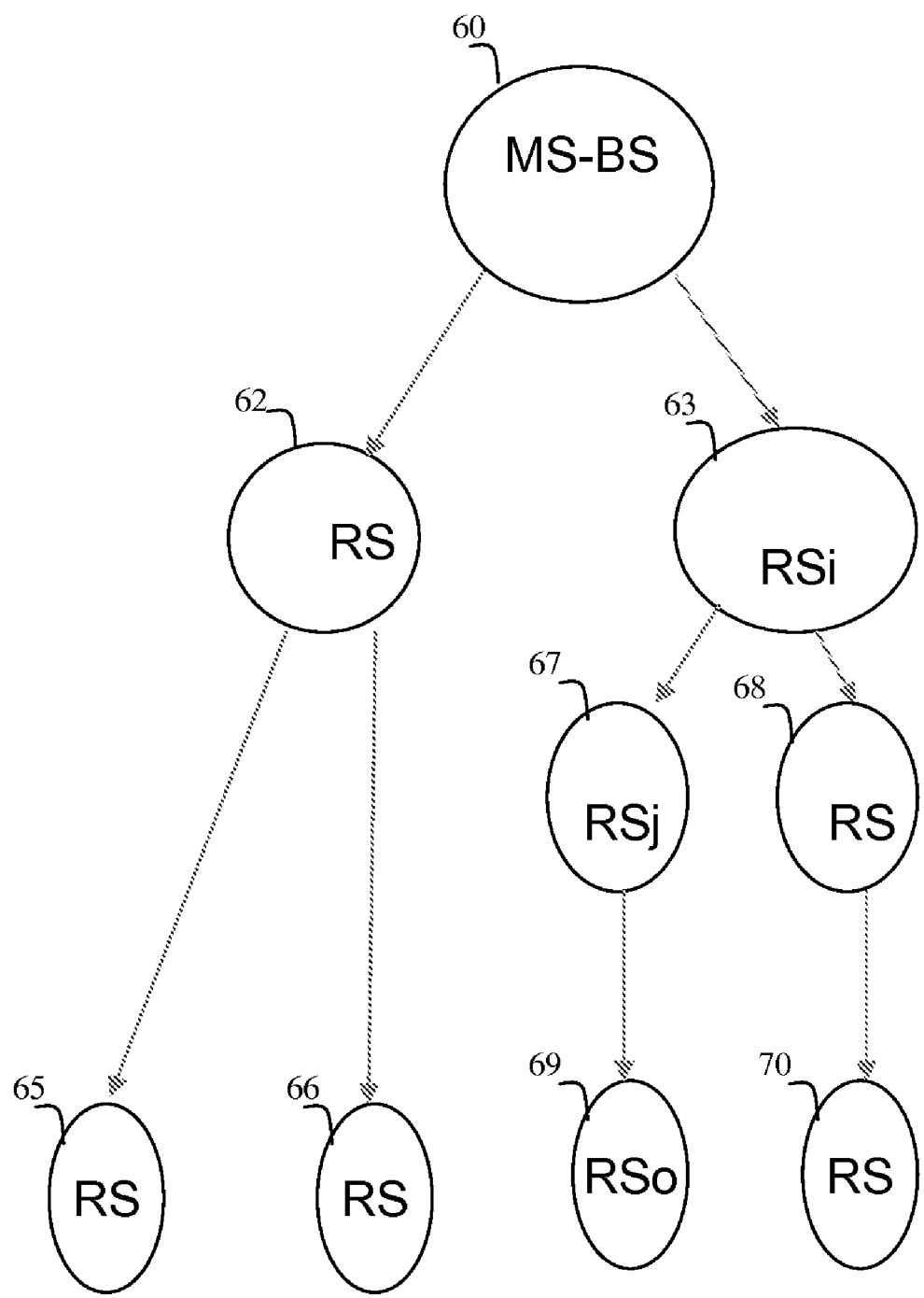
FIG. 1 is a block diagram of an embodiment of a relay network embodying the principles of the invention.

FIG. 1 is a schematic diagram of a simple PMP (point-multi-point) relay network 10 in which the invention may be embodied. In this example, the components embody those of an 802.16j standards based network, though the invention applies generally to relay networks as will be seen. At the tree trunk level, a master base station (MS-BS) 60 communicates with relay stations RS 62 and RS 63. RS 62 in turn communicates with RS 65 and RS 66. Similarly, RS 63 communicates with RS 67 and RS 68. RS 67 communicates with RS 69, and RS 68 communicates with RS 70. In an 802.16j standards based network, the RS 65, 66, 69, and 70 may be subscriber stations (SS)—end-user stations in the relay network.

Figure 2:
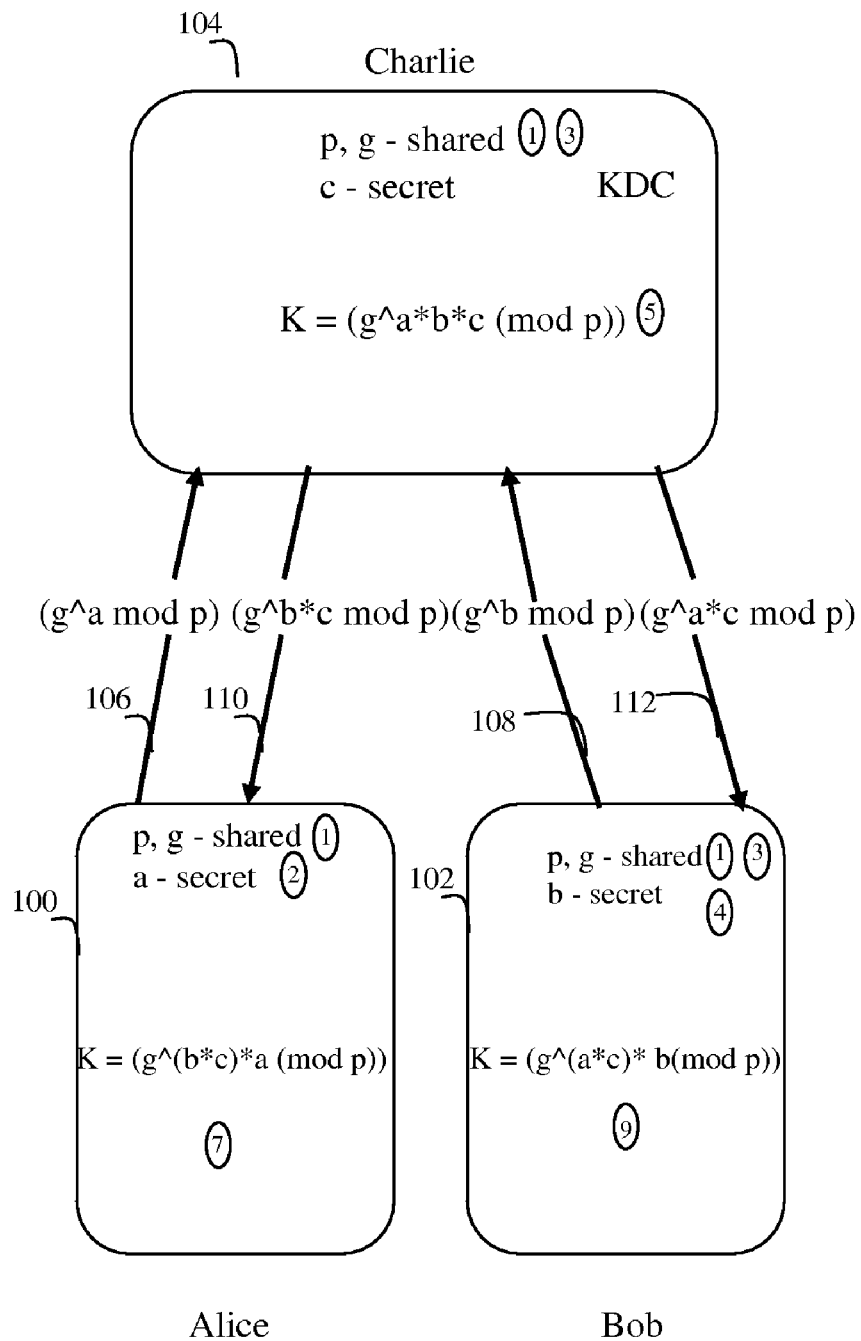
FIG. 2 is a block diagram of key exchange mechanism in accordance with the invention.

Through the use of a PMP multi-hop relay protocol, a payload can, for example, be delivered from BS 60 to RS 69 through RS 63 and RS 67. FIG. 1 is only one example of a PMP multi-hop relay network that can be used with the present invention. It is to be understood that the number of RS's in the network can vary from that shown in FIG. 2. The example of FIG. 2 is a tree topology, and this is assumed for the details that follow.

As can be seen, various relay links such as 72 and 74 may be present between a base station 60 and a subscriber station such as 70 at any given time. Secure communications are required nevertheless. But standard key exchange algorithms such as Diffie-Hellman key exchange cannot be reliably used between a base station 60 and a relay or subscriber station 70 in such a relay environment because the relay links are potentially unsecure.

A novel key exchange mechanism is hereby presented to solve this problem. The key exchange mechanism of the invention provides reliable key exchange among multiple members of a group, even in a relay network environment wherein the link are unsecure. A simplified version of mechanism of the invention is shown in FIG. 2. As shown, there are three participants—Alice 100, Bob 102, and Charlie 104. Charlie 104 is the Key Distribution Center (KDC), and is trusted by both Alice 100 and Bob 102. Numbered circles in FIG. 2 correspond to listed steps below. Familiarity with basic Diffie Hellman key exchange is assumed. The trusted key K is generated and distributed as follows:

1. Alice and Charlie agree to use a prime number p and a generator g.
2. Alice chooses a secret integer a, then sends Charlie ($g^a$ (mod p)). (106)
3. Bob and Charlie agree to use the prime number p and generator g.
4. Bob chooses a secret integer b, then sends Charlie ($g^{(mod p)}$). (108)
5. Charlie generates the group key ($g^{a*b*c}$ (mod p)) where c is the random number chosen by Charlie.
6. In accordance with the invention, Charlie sends the partial key to Alice ($g^{*c}$ (mod p)) (110)
7. In accordance with the invention, Alice completes the group key by calculating ($g^{(b*c)*a}$ (mod p))
8. In accordance with the invention, Charlie sends the partial key to Bob ($g^{a*c}$ mod p) (112)
9. In accordance with the invention, Bob completes the group key by calculating ($g^{(a*c)*b}$ mod p)

Alice, Bob, and Charlie can now use the group key, for example, generation of further keys, e.g. to generate a symmetric key for encrypting data for relaying data between Alice and Bob via Charlie.

It is now shown how this novel reliable key exchange algorithm can be implemented in a network relay environment such as that shown in the 802.16 network 10 of FIG. 1. The key exchange mechanism of the invention operates generally in a network group including key distribution center (KDC) and m relay members. In the case of FIG. 1, m=8 and the KDC is the MS-BS 60. There are 8 relay stations 62, 63, 65, 66, 67, 68, 69, and 70. The relay stations 65, 66, 69, and 70 are shown as subscriber stations that are end nodes in the network, or leafs on the tree. Relay stations 63 and 67 are labeled RS(i) and RS(j) for ease of understanding of the description. It is clear that any relay station could be labeled RS(i) and a lower level relay station could be labeled RS(j).

Figure 3:
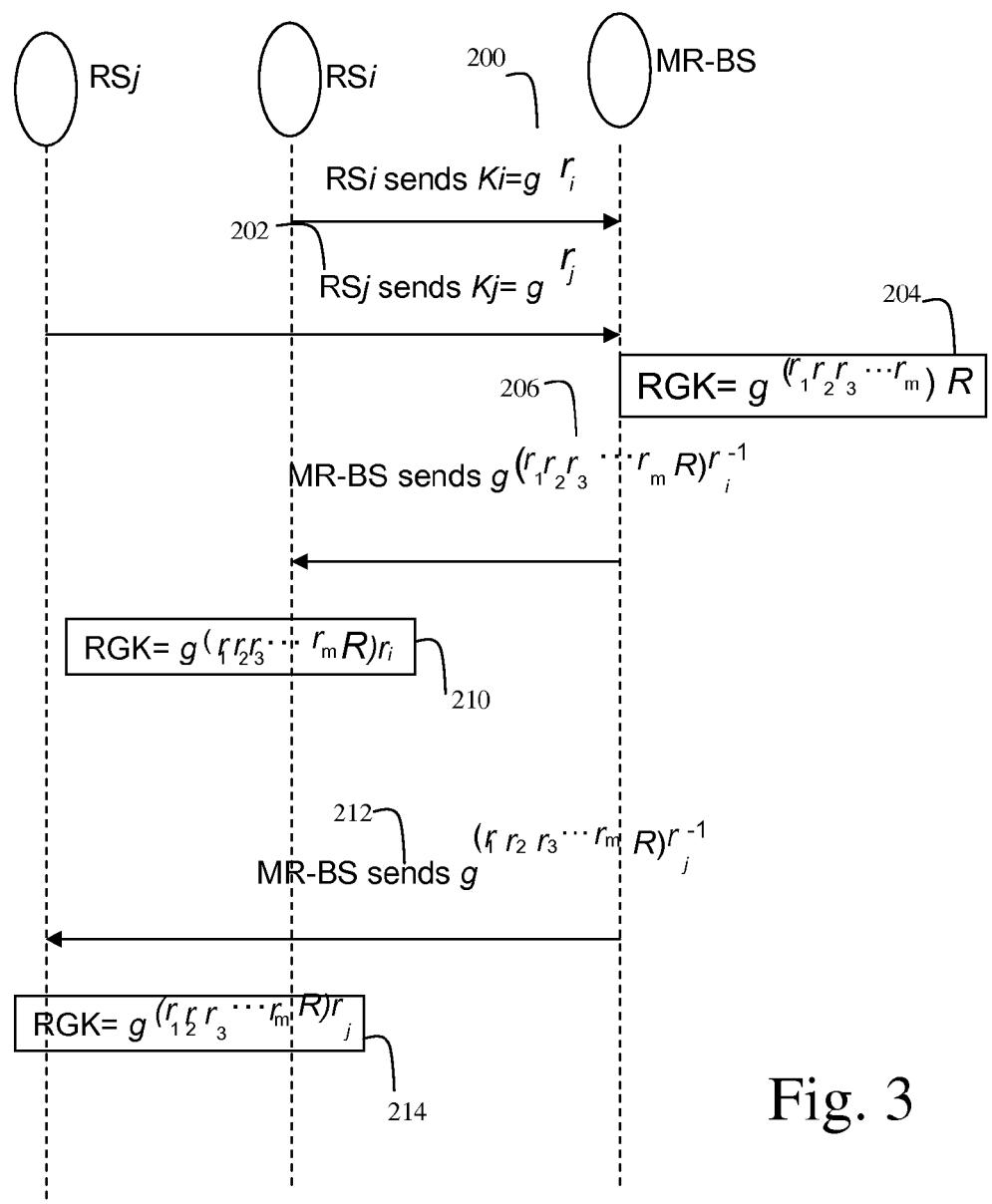
FIG. 3 is a message exchange diagram showing the key exchange messages between stations in a relay network in accordance the invention.

Now, for purposes of example, assume that the MS-BS 60 of FIG. 1 is the KDC, and that a key exchange must occur between RS 67 and RS 63 and MS-BS 60. The message exchange diagram between these network elements is shown in FIG. 3. All messages shown here (and in FIG. 4) are modulo p so mod p is not shown. The MR-BS 60 is collecting all RS(i) keys from downstream relay stations R(i . . . m), (e.g. 62, 63, 65, 66, 67, 68, 69, and 70). Each relay station sends a key to the MR-BS KDC station 60 based on its own secret number r(i), so for example for relay station 63 K(i)=g^(i) (FIG. 3 200). This is similar to the example of FIG. 2, wherein Alice sent a key to Charlie based on Alice's secret number a. Similarly, relay station 67 sends a key to the MR-BS KDC station 60 based on its own secret number r(j), so for example for relay station 67 K(j)=g^(j) (FIG. 3 202). This is similar to the example of FIG. 2, wherein Bob sent a key to Charlie based on Bob's secret number b. The MR-BS KDC station 60 ultimately generates the RGK key 200, which is based on all secret keys from all relay stations r(1 . . . m) and its own secret key R, and is calculated as a function of g^((r(1)r(2) . . . r(m))R), similar to the RGK calculated by Charlie in FIG. 1. (FIG. 3 204)

Now, each of the RS(i) must generate the RGK itself from information it receives back from the MS-BS 60. In order to enable this, the MS-BS 60 will unicast a partial key to each RS(i). For example, the MS-BS returns the partial key g^(r(1) r(2)r(3) . . . r(m)R)r(i)-1 to the relay station RS(i) 63 (FIG. 3 206). Once combined with the RS(i) node's secret number r(i) that is already known on RS(i) node, e.g. as RGK=g^(r(1) r(2) . . . r(m))R)r(i), (FIG. 3 210), the key is now known at node RS(i). This is the same as in the example of FIG. 2, wherein Alice received the key based on b*c from Charlie, and combined it with her secret number a to arrive at the RGK. In the same manner, as shown in FIG. 3, for the node RS(j) 67, the MR-BS 60 returns the code g^(r(1)r(2)r(3) . . . r(m)R)r (j)-1 (FIG. 3 212). Once combined with the RS(j) node's secret number r(j) as RGK=g^(r(1)r(2) . . . r(m))R)r(j), (FIG. 3 214), the RGK is now known at node RS(j).

Figure 4:
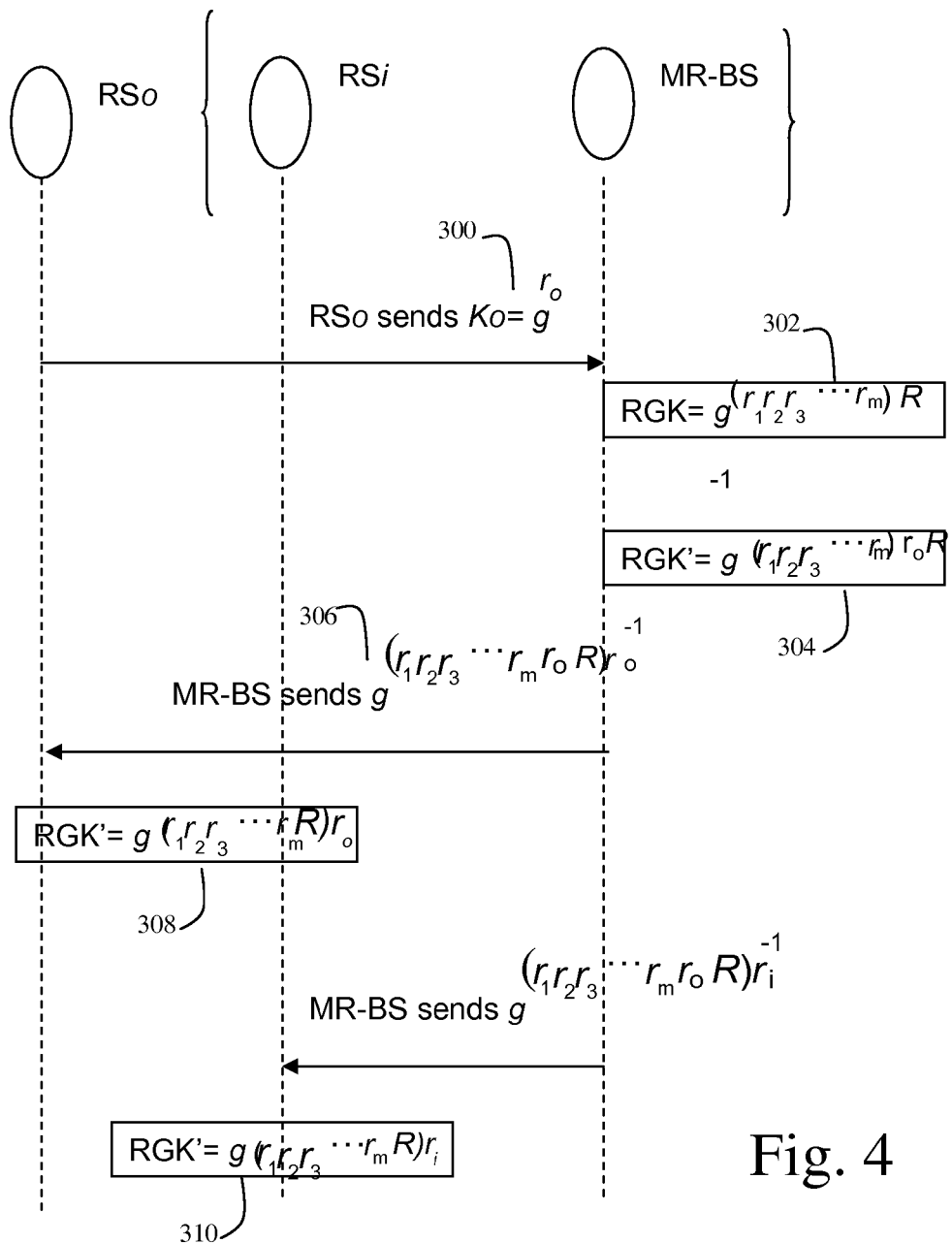
FIG. 4 is a message exchange diagram showing the key exchange messages between stations in a relay network when a station joins the network in accordance the invention.

In accordance with a further aspect of the invention, once an RGK is established throughout a network, a new node can join the network in a similar manner, as shown in the message exchange diagram of FIG. 4. For instance, assume relay node RS(o) 69 is joining relay tree of FIG. 1. RS(o) 69 sends random key K(o)=g^(o) up the tree towards the MR-BS 60 (FIG. 4 300). At the MR-BS 60, the RGK message would be modified from the original RGK key 200 of g^(r(1)r(2) . . . r(m))R) (FIG. 4 302) such that it would now reflect the random number r(o) as shown in FIG. 4—RGK'=g^(r(1)r(2) . . . r(m))r(o)R), (FIG. 4 304). Then MR-BS 60 sends back the partial key to RS(o) 69 containing g^(r(1)r(2)r(3) . . . r(m)r(o) R)r(o)-1, (FIG. 4 306), leading RS(o) to deduce the shared key RGK'=g(r(1)r(2)r(3) . . . r(m)R)r(o). This RGK is also unicast to all other RS(i) in the relay network (FIG. 4 310). Thus, the new member RS(o) is not aware of the RGK for the previous group, thereby preserving backwards secrecy.

Also in accordance with the invention, when a node in the relay network leaves the network, the RGK is updated again based on network membership, unicast to all the RS(i). This is done in order to protect forward secrecy in the relay network.

Once each node in the relay network 10 has a copy of the shared secret key, data can be encrypted using the shared secret key and relayed securely from any node RS through the MR-BS to any other node RS.

From these examples it can be seen why other generalized Diffie Hellman schemes, such as GDH-1,2,3, cannot be used in applications such as this 802.16j relay system. In the known DH schemes, keys are chained—that is, each key is modified by the next node up the tree. In the modified DH scheme of the invention, new keys are distributed in a hub-and-spoke fashion, thus the group key arrives at a node before it is trusted by others in the chain. Backwards secrecy is thereby preserved.

The group key generation mechanism of the invention is broadly applicable to various applications. For example, multi-party video conference Ethernet applications can benefit from the advantages of the group key generation mechanisms described herein, as can multicast telepresence applications, wireless sensor networks, and various other applications wherein group keys must be exchanged.

The various aspects of the present invention may be implemented in the MS-BS 60, or various RS 62—70 as hardware, PGA FPGA, ASIC, and/or one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

We claim:

1. A method for use in a network of m members comprising the steps of:
   arranging the network such that one member is a key distribution center (KDC) and the other m members are relay stations (RS), wherein RS(i) denotes the ith RS;
   sending by each RS(i) a random number K(i) based on g^r(i) to the KDC, wherein g is a generator and r(i) is a random integer picked by the RS(i);
   generating by the KDC a random group key RDK based on g^(r(1)r(2) . . . r(m))R, wherein g is the generator, and R is a random number generated by the KDC;
   sending by the KDC back to each RS(i) a partial key g^((r(1)r(2) . . . r(m))Rr(i)$^{-1}$); generating by each RS(i) from the received partial key the RDK based on g^(r(1) r(2) . . . r(m)R)r(i); and
   using the RDK by all m members of the group to secure communications between the members of the group.

2. The method of claim 1 further comprising the steps of:
   adding a new relay station RS(o) to the network;
   sending by RS(o) a random number K(o) based on g^r(o) to the KDC, wherein g is a generator and r(o) is a random integer picked by the RS(o);
   generating by the KDC a random group key RDK' based on g^(r(1)r(2) . . . r(m)r(o))R;
   sending by the KDC back to RS(o) a partial key g^((r(1) r(2) . . . r(m)r(o)R)r(o)$^{-1-}$);
   sending by the KDC back to each RS(i) a partial key g^((r(1)r(2) . . . r(m)r(o))Rr(i)$^{1}$); and
   using the RDK' by all m members of the group and RS(o) to secure communications between the members of the group including RS(o).

3. A method for use by a node in a relay network comprising the steps of:
   sending by a relay station RS(1) a random number K(1) based on g^r(1) to a key distribution center (KDC), wherein g is a generator and r1 is a random integer picked by RS1, RS1 being one of group of m relay stations wherein RS(i) notes the ith RS and each RS(i) sends a K(i) based on g^r(i) to the KDC;
   receiving by RS(1) partial key g^((r(2) . . . r(m))Rr(1)$^{-1}$), the partial key generated and sent by the KDC, the KDC first generating a random group key RDK based on $g\^{}(r(1)r(2)\ldots r(m))R$, wherein g is the generator, and R is a random number generated by the KDC, the KDC then generating the partial key;

generating by RS(1) from the received partial key the RDK based on $g\^{}(r(2)\ldots r(m)R)r(1)$; and using by RS(1) the RDK for secure communications between RS1 and the other relay stations of the group.

4. A network comprising:

a group including m relay stations RS, wherein RS(i) denotes the ith RS;

a key distribution center KDC;

wherein each RS(i) sends a random number K(i) based on $g\^{} r(i)$ to the KDC;

wherein the KDC generates a random group key RDK based on $g\^{}(r(1)r(2)\ldots r(m))R$, wherein g is a generator, R is a random number generated by the KDC, and r(1), r(2) ... r(m) are random numbers generated by each RS(i) RS(1), RS(2) ... RS(m) respectively;

wherein the KDC sends back to each RS(i) a partial key based on $g\^{}((r(1)r(2)\ldots r(m))Rr(i)^{-1})$;

wherein each RS(i) uses the received partial key to generate the RDK based on $g\^{}(r(1)r(2)\ldots r(m)R)r(i)$; and wherein the RDK is used by all m members of the group to secure communications between the members of the group.

5. The network of claim 4 comprising:

a new relay station RS(o) added to the network;

wherein RS(o) sends a random number K(o) based on $g\^{}r(o)$ to the KDC, wherein g is a generator and r(o) is a random integer picked by the RS(o);

wherein the KDC generates a random group key RDK' based on $g\^{}(r(1)r(2)\ldots r(m)r(o))R$;

wherein the KDC sends back to RS(o) a partial key $g\^{}((r(1)r(2)\ldots r(m)r(o)R)r(o)^{-1})$;

wherein the KDC sends back to each RS(i) a partial key $g\^{}((r(1)r(2)\ldots r(m)r(o))Rr(i)^{-1})$; and wherein the RDK' is used by all m members of the group and RS(o) to secure communications between the members of the group including RS(o).

* * * * *